(No Model.)
J. C. ANDERSON.
HOLLOW BRICK WALL.
No. 467,489. Patented Jan. 26, 1892.
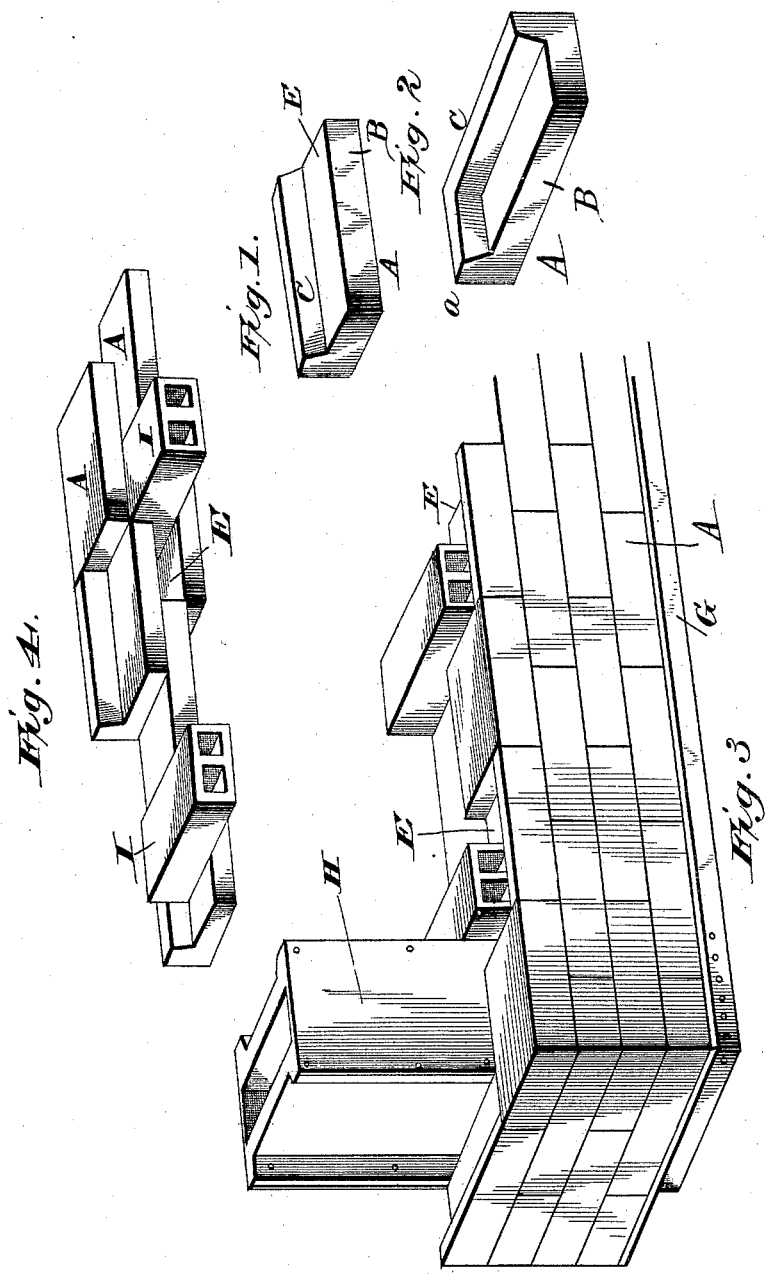
WITNESSES
F. L. Ourand
H. M. Sterling
INVENTOR
J. C. Anderson
by L. W. Ginsabaugh
Attorney

UNITED STATES PATENT OFFICE.

JAMES C. ANDERSON, OF HIGHLAND PARK, ILLINOIS.

HOLLOW BRICK WALL.

SPECIFICATION forming part of Letters Patent No. 467,489, dated January 26, 1892.

Application filed November 26, 1890. Serial No. 372,694. (No model.)

*To all whom it may concern:*

Be it known that I, JAMES C. ANDERSON, a citizen of the United States, and a resident of Highland Park, in the county of Lake and State of Illinois, have invented new and useful Improvements in Hollow Brick Walls; and I do hereby declare the following to be a full, clear, and exact description of said invention, reference being had to the accompanying drawings, and to the letters of reference marked thereon, which form a part of this specification.

My invention relates to the construction of the outer walls of buildings, and more particularly to high fire-proof buildings, where great strength, solidity, and close surface texture is a requisite.

In order to obtain a more concise view of the state of the art in this connection, I will first explain that the rapid advancement in the art of production of steel channel-beams suitable for the construction of the skeletons or frame-work of high buildings and the great demand for them in the large cities in the utilization of ground-space for buildings, has brought us face to face with a new requirement for a suitable outer-wall covering which shall afford the proper weather-surface, not only to act as a barrier against the storms, rains, snows, and freezings, but also to protect the steel skeleton essential in this kind of structure from the action of fire, and at the same time to present a surface to the general atmosphere of the city that will in the most effectual manner shed the moisture of the atmosphere and resist the constantly-increasing smoke and noxious gases incident to a growing city. It will be understood, also, in this connection that these buildings for the most part, under the present state of the art, must be constructed of terra-cotta or burnt clay in various forms, for the reason that such material is necessary to render this kind of structure fire-proof; and in order to reduce the weight of the structure to the minimum and to properly distribute the load of these high buildings upon the steel channels of the skeleton or metal frame-work it is highly desirable that the terra-cotta of the various kinds be as light as possible. This is fairly met, so far as relates to the inner partition-walls and to the building between the joist-spaces of the various floors; but the ordinary hollow tile and terra-cotta products thus employed and made by what is known as the "wet process" are too frail and porous and are entirely inadequate for the main outer walls of such buildings.

Various patents have been granted to me from time to time for the production of clay bodies for the outer walls of buildings, with the main object in view of producing these bodies with the closest possible bodily texture, so as to resist the osmotic action of the atmosphere, and at the same time give to the walls of the building solidity, strength, and durability, and in which I have explained the difficulties met with in pressing large clay bodies into form out of dry clay powder and alleged the advantages to be gained in the compactness and solidity of these clay bodies where a uniform pressure could be brought upon the dry clay powder in the production of thin slabs. I have also shown products for which patents were granted to me for hollow brick having a body of ribs or thin slabs; but such latter-named bodies have been exceedingly difficult of production in a practical way, owing to their peculiar shape and to the difficulties then met with in molding such articles, which are necessarily formed in high relief without corresponding depressions, and no means have been hereto provided for pressing articles from dry clay in high relief without depressions—*i. e.,* having portions of their surfaces standing well outward therefrom.

To these ends my invention consists in novel features of construction in the laying of such bricks for the production of hollow walls and in securing the same to the steel skeletons or frame-work of such buildings, which will be more fully hereinafter disclosed.

Referring to the drawings, Figure 1 is a view in perspective of one of the bricks to be used as a stretcher in laying up the face of the wall. Fig. 2 is a view in perspective of the brick adapted to form the corners and reveals of the wall. Fig. 3 shows a wall in perspective partly laid up with these bricks and in which the rear part of the wall is laid up with common bricks. Fig. 4 is a rear detail view of a wall, showing the manner of binding the facing-bricks to the rear part of the wall of common bricks.

The brick A is formed in the shape of an L, with the main body B or side thereof of the usual length and width of pressed facing-brick and with a body thickness of one-half of that of a full brick, while the front part C of the brick represents the full size of the face edge or weather-surface of a brick, leaving the displaced portion E of the brick to be utilized in the production of hollow spaces in the outer walls, as shown in Figs. 3 and 4 of the drawings. For forming the corners and reveals of these walls the L or front part of each brick is made to extend also across one end of the same, as shown at $a$, Fig. 2. This is shown as for a plain corner; but such corners may be and are embellished with corner or reveal moldings formed thereon by giving the proper curves small outer configurations to the corner portion of the facing parts C and $a$. In laying up walls of this character flanged sole or bed plates G are firmly riveted or bolted to the upright channel beams or posts H of the skeleton or frame-work of the building, which serve as a foundation or bed-plate upon which the first course of bricks is laid. This bed-plate is preferably made of rolled-steel angle-bars, so as to provide a suitable flange for securing the same to the posts of the frame-work and to allow a projecting flange or ledge of suitable width to provide a bearing-surface for the bricks to rest on. Upon this the several courses of the brick A are laid one upon the other, each alternate brick in the course being reversed in the laying—that is, if the first brick is laid with the L part facing or projecting upward, the brick next thereto in the same course will be laid with the L part projecting downward, and so on alternately throughout the wall, by which means the edges or weather-surface of the brick will be laid outwardly, forming the facing of the wall, and suitable pockets will be formed on the rear part thereof of the proper size to admit the end of a standard common brick I for the binding-courses at the distance of every fourth half-brick in each course, which serve to firmly bind the face part of the wall of pressed brick to the rear wall of common brick and leave the other part of the spaces E, as shown plainly in Figs. 3 and 4, to be represented as alternating hollow spaces throughout the whole wall, and at the same time allowing all the facing-bricks to be uniformly laid as stretchers without exposing the ends of the binding-courses to view in the front part of the wall. Thus there is presented in the wall itself a weather-surface of pressed brick heretofore unattainable in the construction of such buildings and a hollow wall firmly bound with the other parts of the structure.

Having thus described my invention, what I claim in this application is—

1. In the walls of buildings of the character described, the facing-brick A, of L form, provided with the web B and flange $c$, laid with the flange $c$ alternating upward and downward, so as to form alternating pockets at every fourth half-brick in each course to receive the binding-bricks I of the rear wall, substantially as described.

2. In the hollow walls of buildings, bricks A, of L form, laid with their flanges alternating upward and downward and so as to admit and interlock with the binding-bricks I at intervals and at the same time leave the hollow space E in the rear part of the L-brick A, substantially as described.

In testimony whereof I affix my signature in presence of two subscribing witnesses.

J. C. ANDERSON.

Witnesses:
I. J. SHUART,
J. C. CUSHMAN.